(12) United States Patent
Weisman et al.

(10) Patent No.: US 10,491,947 B1
(45) Date of Patent: Nov. 26, 2019

(54) SYSTEMS AND METHODS FOR PERSONALIZED VIDEO RENDERING

(71) Applicant: XMPie (Israel) Ltd., Netanya (IL)

(72) Inventors: Hanan Weisman, Givat Ada (IL); Galit Zwickel, Or Yehuda (IL); Amit Cohen, Herzeliya (IL)

(73) Assignee: XMPIE (ISRAEL) LTD., Netanya (IL)

( * ) Notice: Subject to any disclaimer, the term of this patent is extended or adjusted under 35 U.S.C. 154(b) by 0 days.

(21) Appl. No.: 16/232,345

(22) Filed: Dec. 26, 2018

(51) Int. Cl.
| | |
|---|---|
| H04N 7/16 | (2011.01) |
| H04N 21/44 | (2011.01) |
| H04N 21/45 | (2011.01) |
| H04N 21/437 | (2011.01) |
| H04N 21/431 | (2011.01) |

(52) U.S. Cl.
CPC ............ H04N 21/44 (2013.01); H04N 21/437 (2013.01); H04N 21/4318 (2013.01); H04N 21/4532 (2013.01)

(58) Field of Classification Search
CPC .. H04N 21/44; H04N 21/4318; H04N 21/437; H04N 21/4532
See application file for complete search history.

(56) References Cited

U.S. PATENT DOCUMENTS

| | | | |
|---|---|---|---|
| 8,666,226 B1 | 3/2014 | Kalish et al. | |
| 10,027,995 B2 | 7/2018 | Rubenczyk | |
| 2001/0047369 A1 | 11/2001 | Aizikowitz et al. | |
| 2013/0089305 A1* | 4/2013 | Harnevo | G11B 27/031 386/285 |
| 2013/0195429 A1* | 8/2013 | Fay | H04N 9/87 386/278 |
| 2015/0221000 A1* | 8/2015 | Cohen-Martin | G06Q 30/02 705/14.73 |

* cited by examiner

Primary Examiner — Mulugeta Mengesha
(74) Attorney, Agent, or Firm — Pearl Cohen Zedek Latzer Baratz LLP

(57) ABSTRACT

Generally, systems and methods for generating personalized videos are disclosed. The systems and methods can enable parallel and/or on-demand and/or video portions-based rendering of a plurality of personalized videos for a plurality of recipients. The disclosed systems and methods can significantly reduce amount of processing resources and amount of time required to render the personalized videos thereof, as compared to current available systems and methods.

20 Claims, 6 Drawing Sheets

SYSTEMS AND METHODS FOR PERSONALIZED VIDEO RENDERING

FIELD OF THE INVENTION

The present invention relates to the field systems and methods for personalized video rendering, and more particularly, systems and methods for on-demand personalized video rendering.

BACKGROUND OF THE INVENTION

Nowadays, it can be frequently required to generate and maintain a plurality of personalized videos (such as personalized marketing videos) for a plurality of recipients (such as users, banks, companies, etc.).

Current systems and methods for generating of personalized videos typically require large amount of processing resources and large amount of time required to render the personalized videos thereof. For example, some current systems can require 5 to 10 minutes to render single personalized video of 1 minute. Such a response time is not commercially acceptable. Accordingly, rendering of 1000 personalized videos can require a week. Such long rendering times can make most of the current systems and methods commercially non-viable.

SUMMARY OF THE INVENTION

One aspect of the present invention provides a system for generating personalized videos for a plurality of recipients, the system includes at least one computing device to: receive a video template that includes a plurality of dynamic data elements and a data set that includes possible data set values for at least some of the plurality of dynamic data elements; determine a plurality of video portions based on the video template, wherein each video portion of the plurality of video portions is one of: static, reusable, or unique, wherein a static video portion does not change between different recipients of the plurality of recipients, a reusable video portion can change, within a bounded set of values, between different recipients of the plurality of recipients, and a unique video portion can change, within an unbounded set of values, between different recipients of the plurality of recipients; render at least some video portions of the plurality of video portions that are static, to yield rendered static video portions; render at least some possible variations of at least some video portions of the plurality of video portions that are reusable, based on at least some of the data set values, to yield rendered reusable video portions; receive a request from a specific recipient of the plurality of recipients for a personalized video; determine recipient-specific rendered reusable video portions of the rendered reusable video portions that are associated with the specific recipient and that are required to provide the personalized video, based on recipient-specific data set values of the data set values that are associated with the specific recipient; and combine the recipient-specific rendered reusable video portions thereof with the rendered static video portions, to provide the personalized video.

In some embodiments, the at least one computing device to: retrieve, from the data set, the recipient-specific data set values or to receive the recipient-specific data set values thereof, and to determine, based on the recipient-specific data set values, recipient-specific unique video portions of the plurality of video portions that are required to provide the personalized video; render the recipient-specific unique video portions, based on the recipient-specific data set values, to yield recipient-specific rendered unique video portions; and combine the recipient-specific rendered unique video portions with the recipient-specific rendered reusable video portions and the rendered static video portions to provide the personalized video.

In some embodiments, the at least one computing device is further to determine at least some of the plurality of video portions such that a time duration required to render each of the video portions thereof is no more than a predetermined rendering time constant.

In some embodiments, the at least one computing device is further to determine each of at least some of the plurality of video portions to include a single dynamic data element of the plurality of dynamic data elements to ensure that a total number of possible variations of the video portions to be rendered is of the same computational order as a total number of the data set values in the data set.

In some embodiments, the at least one computing device to render the recipient-specific unique video portions in parallel.

In some embodiments, the at least one computing device to store the rendered static video portions, the rendered reusable video portions and the recipient-specific rendered unique video portions.

In some embodiments, the at least one computing device to: determine at least one required recipient-specific unique video portion of the recipient-specific unique video portions that is required to provide the personalized video, based on the recipient-specific data set values; and identify the at least one required recipient-specific unique video portion in the repository module.

In some embodiments, the at least one computing device to: render the at least one required recipient-specific unique video portion to provide the at least one rendered required recipient-specific unique video portion, upon failure to identify the at least one required recipient-specific unique video portion in the repository module; and combine the at least one rendered required recipient-specific unique video portion with the recipient-specific rendered reusable video portions and the rendered static video portions, to provide the personalized video.

In some embodiments, the at least one computing device to: retrieve corresponding at least one rendered required recipient-specific unique video portion from the repository module, upon identification of the at least one required recipient-specific unique video portion; and combine the at least one rendered required recipient-specific unique video portion with the recipient-specific rendered reusable video portions and the rendered static video portions, to provide the personalized video.

In some embodiments, the at least one computing device to: determine at least one required non-rendered video portion of the plurality of video portions that is required to provide the personalized video and that is not rendered; determine, based on the video template, at least one streaming time at which the at least one required non-rendered video portion is intended to be streamed; determine at least one rendering time required to render the at least one required non-rendered video portion thereof; and stream the personalized video if the at least one rendering time is smaller than at least one streaming time.

Another aspect of the present invention provides a method for generating a personalized video for a plurality of recipients, the method includes: receiving, by a computing device, a video template that includes a plurality of dynamic data elements; receiving a data set that includes possible data set values for at least some of the plurality of dynamic data elements; determining a plurality of video portions based on the video template, wherein each video portion of the plurality of video portions is one of: static, reusable, or unique, wherein a static video portion does not change between different recipients of the plurality of recipients, a reusable video portion can change, within a bounded set of values, between different recipients of the plurality of recipients, and a unique video portion can change, within an unbounded set of values, between different recipients of the plurality of recipients; determining and rendering at least some video portions of the plurality of video portions that are static, to yield rendered static video portions; determining and rendering at least some possible variations of at least some video portions of the plurality of video portions that are reusable, based on at least some of the data set values, to yield rendered reusable video portions; receiving a request from a specific recipient of the plurality of recipients for the personalized video; determining recipient-specific rendered reusable video portions of the rendered reusable video portions that are associated with the specific recipient and that are required to provide the personalized video, based on recipient-specific data set values of the data set values that are associated with the specific recipient; and combining the recipient-specific rendered video portions thereof with the rendered static video portions, to provide the personalized video.

In some embodiments, the method further includes: retrieving, from the data set, the recipient-specific data set values or receiving the recipient-specific data set values thereof; determining, based on the recipient-specific data set values, recipient-specific unique video portions of the plurality of video portions that are required to provide the personalized video; rendering the recipient-specific unique video portions, based on the recipient-specific data set values, to yield recipient-specific rendered unique video portions; and combining the recipient-specific rendered unique video portions with the recipient-specific rendered reusable video portions and the rendered static video portions to provide the personalized video.

In some embodiments, the method further includes determining at least some of the plurality of video portions such that a time duration required to render each of the video portions thereof is no more than a predetermined rendering time constant.

In some embodiments, the method further includes determining each of at least some of the plurality of video portions to include a single dynamic data element of the plurality of dynamic data elements to ensure that a total number of possible variations of the video portions to be rendered is of the same computational order as a total number of the data set values in the data set.

In some embodiments, the method further includes rendering the recipient-specific unique video portions in parallel.

In some embodiments, the method further includes storing the rendered static video portions, the rendered reusable video portions and the recipient-specific unique video portion in a repository of rendered video portions.

In some embodiments, the method further includes: determining at least one required recipient-specific unique video portion of the recipient-specific unique video portions that is required to provide the personalized video, based on the recipient-specific data set values; and identifying the at least one required recipient-specific unique video portion in the repository of rendered video portions.

In some embodiments, the method further includes: upon failure to identify the at least one required recipient-specific unique video portion in the repository, rendering the at least one required recipient-specific unique video portion to provide the at least one rendered required recipient-specific unique video portion; and combining the at least one rendered required recipient-specific unique video portion with the recipient-specific rendered reusable video portions and the rendered static video portions, to provide the personalized video.

In some embodiments, the method further includes: upon identification of the at least one required recipient-specific unique video portion in the repository, retrieving corresponding at least one rendered required recipient-specific unique video portion from the repository; and combining the at least one rendered required recipient-specific unique video portion with the recipient-specific rendered reusable video portions and the rendered static video portions, to provide the personalized video.

In some embodiments, the method further includes: determining at least one required non-rendered video portion of the plurality of video portions that is required to provide the personalized video and that is not rendered; determining, based on the video template, at least one streaming time at which the at least one required non-rendered video portion is intended to be streamed; determining at least one rendering time required to render the at least one required non-rendered video portion thereof; and streaming the personalized video if the at least one rendering time is smaller than the at least one streaming time.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
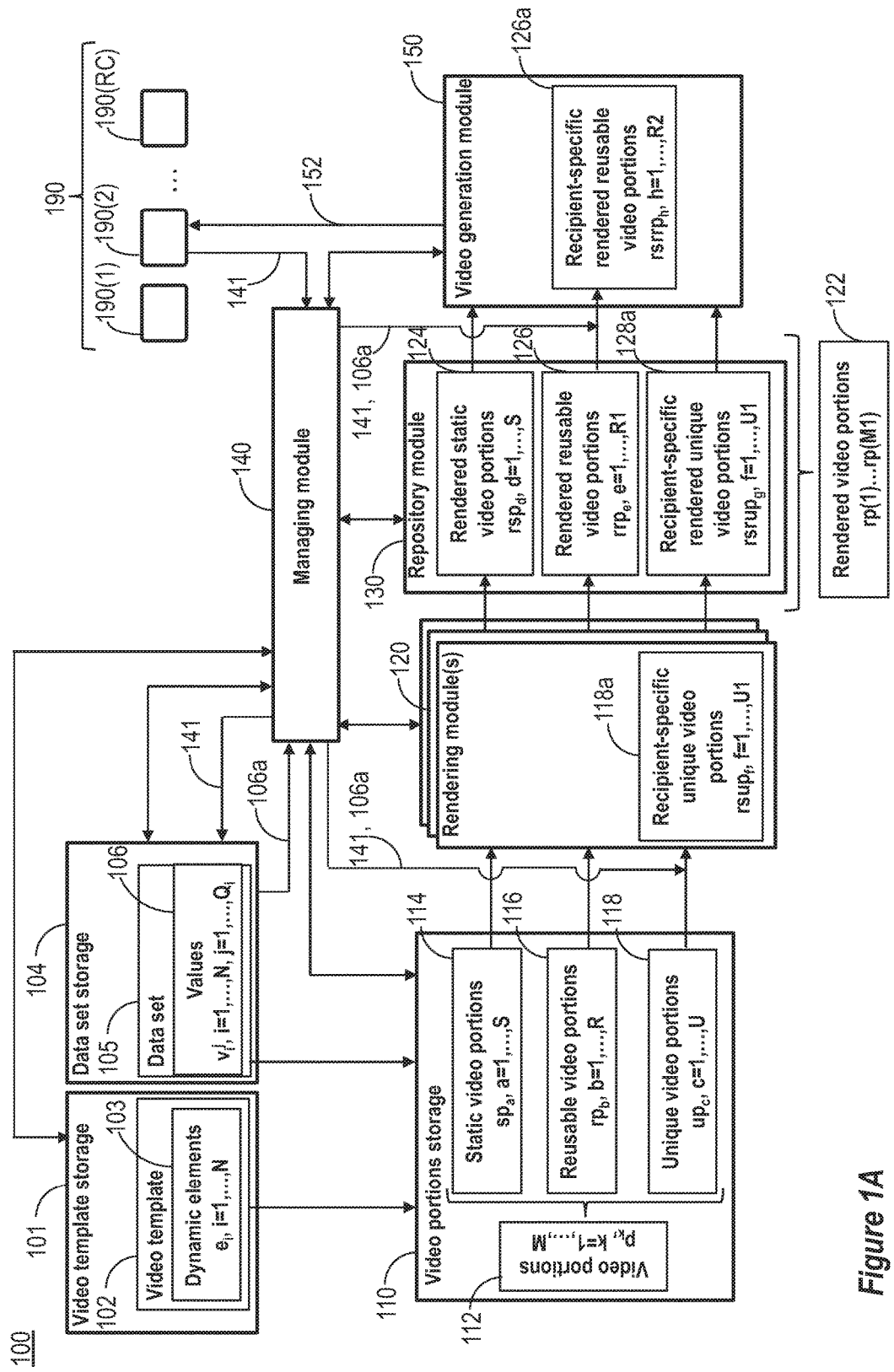
FIG. 1A is a schematic block diagram of a system for generating personalized videos, according to some embodiments of the invention.

It will be appreciated that, for simplicity and clarity of illustration, elements shown in the figures have not necessarily been drawn to scale. For example, the dimensions of some of the elements can be exaggerated relative to other elements for clarity. Further, where considered appropriate, reference numerals can be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, systems and methods for generating personalized videos are disclosed. The method can include determining (e.g., by a computing device) a plurality of video portions (e.g., static, reusable and unique video portions) based on a video template that includes a plurality of dynamic data elements (such as text, graphics, sounds, style, etc.). In some embodiments, each of the plurality of video portions includes single dynamic data element of the plurality of dynamic data elements.

The method can include rendering at least some of static video portions and at least some of possible variations of reusable video portions to yield rendered static video portions and rendered reusable video portions, respectively. The rendered static video portions and the rendered reusable video portions can be stored in a repository of rendered video portions.

The method can further include rendering, for example upon a receipt of a request for a personalized video from a specific recipient of a plurality of recipients (e.g., on-demand rendering), at least some of unique video portions to yield rendered unique video portions. In some embodiments, rendering of the unique video portions is performed in parallel (e.g., using multiple rendering modules of the computing device).

The method can further include combining the rendered static video portions and at least some of the rendered reusable video portions (e.g., that have been already pre-rendered prior to the on-demand request thereof) with at least some of the rendered unique video portions, to provide the personalized video.

Accordingly, the present invention can provide parallel and/or on-demand and/or video portions-based rendering systems and methods that can enable generating a plurality of personalized videos for a plurality of recipients. Some advantages of the invention can include significantly reducing the amount of processing resources and/or an amount of time required to render the personalized videos thereof, for example, as compared to current available systems and methods.

Reference is now made to FIG. 1A, which is a schematic block diagram of a system 100 for generating personalized videos, according to some embodiments of the invention.

According to various embodiments, system 100 includes a video template storage 101, a data set storage 104, a video portions storage 110, at least one rendering module 120, a repository module 130, a managing module 140, a video generation module 150 and/or a plurality of recipients 190.

Video template storage 101 can receive and store a video template 102. Video template 102 can include a plurality of dynamic data elements 103. For example, video template 102 can include N dynamic data elements $e_i$, where $i= 1, \ldots, N$ and N is an integer value, as indicated in FIG. 1A.

In some embodiments, each of dynamic data elements 103 is at least one of: text, graphics (e.g., images, temporal video segments), sounds, style (e.g., color), URL inserts, visibility (e.g., visible for some recipients and invisible for other recipients) and any combination thereof.

Data set storage 104 can receive and store a data set 105. Data set 105 can include data set values 106. Data set values 106 can be a set of possible values of each (or at least some) of dynamic data elements 103.

For example, if a specific dynamic data element of plurality of dynamic data elements 103 includes an image of a car, the data set values for this specific dynamic data element can be, for example, car models (e.g., sport cars, family cars, trucks, etc.). In an example shown in FIG. 1A, data set 105 includes data set values 106 indicated as $v_i^j$ that provide possible values of each of $i=1, \ldots, N$ dynamic data elements 103, wherein each of i dynamic data elements 103 can have $Q_i$ different possible values, where and Q is an integer value.

In some embodiments, data set values 106 are defined/predetermined for each (or at least some) of a plurality of recipients 190. Recipients 190 (indicated as $190(1), \ldots, 190(RC)$ in FIG. 1A) can be, for example, persons, companies or any other entities.

Video portions storage 110 can be in communication with video template storage 102, dataset storage 104 and managing module 140 and can include a plurality of video portions 112. Video portions 112 can be determined by, for example, managing module 140, based on video template 102. For example, managing module 140 can determine M video portions indicated as $p_k$ as in FIG. 1A, where k=1, . . . , M and M is an integer value. Video portions 112 can be combined, upon rendering (as described below), to provide a personalized movie 152.

In some embodiments, each of plurality of video portions 112 is one of: a static video portion 114, a reusable video portion 116 and a unique video portion 118.

In some embodiments, static video portions 114 do not change between different recipient of plurality of recipients 190.

In some embodiments, reusable video portions 116 can change, within a bounded set of values (e.g., data set values 106 of dataset 105), between different recipients of plurality of recipients 190 (e.g., data set values 106 of dataset 105).

In some embodiments, unique video portions 118 can change, within an unbounded set of values, between different recipients of plurality of recipients 190. For example, unique video portions 118 can, in some embodiments, change between all recipients 190.

Video portions 112 can, for example, include S static video portions 114 indicated as $sp_a$ in FIG. 1A (where a=1, . . . , S and S is an integer value); R reusable video portions 116 indicated as $rp_b$ in FIG. 1A (where b=1, . . . , R and R is an integer value); and U unique video portions 118 indicated as $up_c$ in FIG. 1A (where c=1, . . . , U and U is an integer value), where a sum of S, R and U equals a total number of video portions M.

In some embodiments, each of reusable video portions 116 and each of unique video portions 118 includes at least one dynamic data element of dynamic data elements 103.

In some embodiments, managing module 140 determines each (or at least some) of video portions 112 such that a time duration required to render the video portion thereof is no more than a predetermined rendering time constant. In some embodiments, the predetermined rendering time constant is 1 minute. For example, managing module 140 may pre-render the video portions using, for example, a sample data set (such as data set 106) and divide the video portions until the rendering time of each (or at least some) of the video portions is no more than, for example, 1 minute.

In some embodiments, it is not possible to determine video portions of video portions 112 that have rendering time below the predetermined rendering time constant. In these embodiments, managing module 140 generates a respective notification for a user of system 100 that on-demand generation of personalized video 152 is not possible within a specified time range.

In some embodiments, managing module 140 determines at least some of video portions 112 such that the video portions thereof are independent from each other. For example, each (or at least some) of reusable video portions 116 can include a single dynamic data element of plurality of dynamic data elements 103 (e.g., which requires population of a single data field). This can, for example, ensure that a total number of possible variations of reusable video portions 116 to be rendered (e.g., as described below) is of the same computational order as a total number of the data set specific field values 106 (e.g., number of car models, number of city names, etc.).

For example, if each of reusable video portion $rp_b$ includes single dynamic data element of dynamic data elements 103, then when the reusable video portion $rp_b$ thereof are rendered based on data set values 106 there is a constant number of all data set possible values, meaning that the total number of the reusable video portion $rp_b$ to render does not exceed QR.

In some embodiments, it is not possible to determine reusable video portions of reusable video portions 116 that include single dynamic data element. Such cases can, for example, include merging of some of dynamic data elements 103 with a predetermined transparency. In these embodiments, managing module 140 generates a respective notification for a user of system 100 that generation of on-demand personalized video 152 is not possible within the specified time range.

Rendering module(s) 120 can be in communication with video portions storage 110 and managing module 140. Rendering module(s) 120 can render video portions 112 to yield rendered video portions 122 (as described below).

Rendering module(s) 120 can render static video portions 114 to yield rendered static video portions 124. For example, rendered static video portions 124 are indicated in FIG. 1A as $rsp_d$, where d=1, . . . , S.

Managing module 140 can further determine and rendering module(s) 120 can render all (or at least some) possible variations of each (or at least some) of reusable video portions 116, based on data set values 106 of data set 105, to yield rendered reusable video portions 126 (e.g., as described below with respect to FIG. 1B). For example, rendered reusable video portions 126 are indicated in FIG. 1A as $rrp_e$, wherein e=1, . . . , R1 and R1 is an integer value.

Figure 1B:
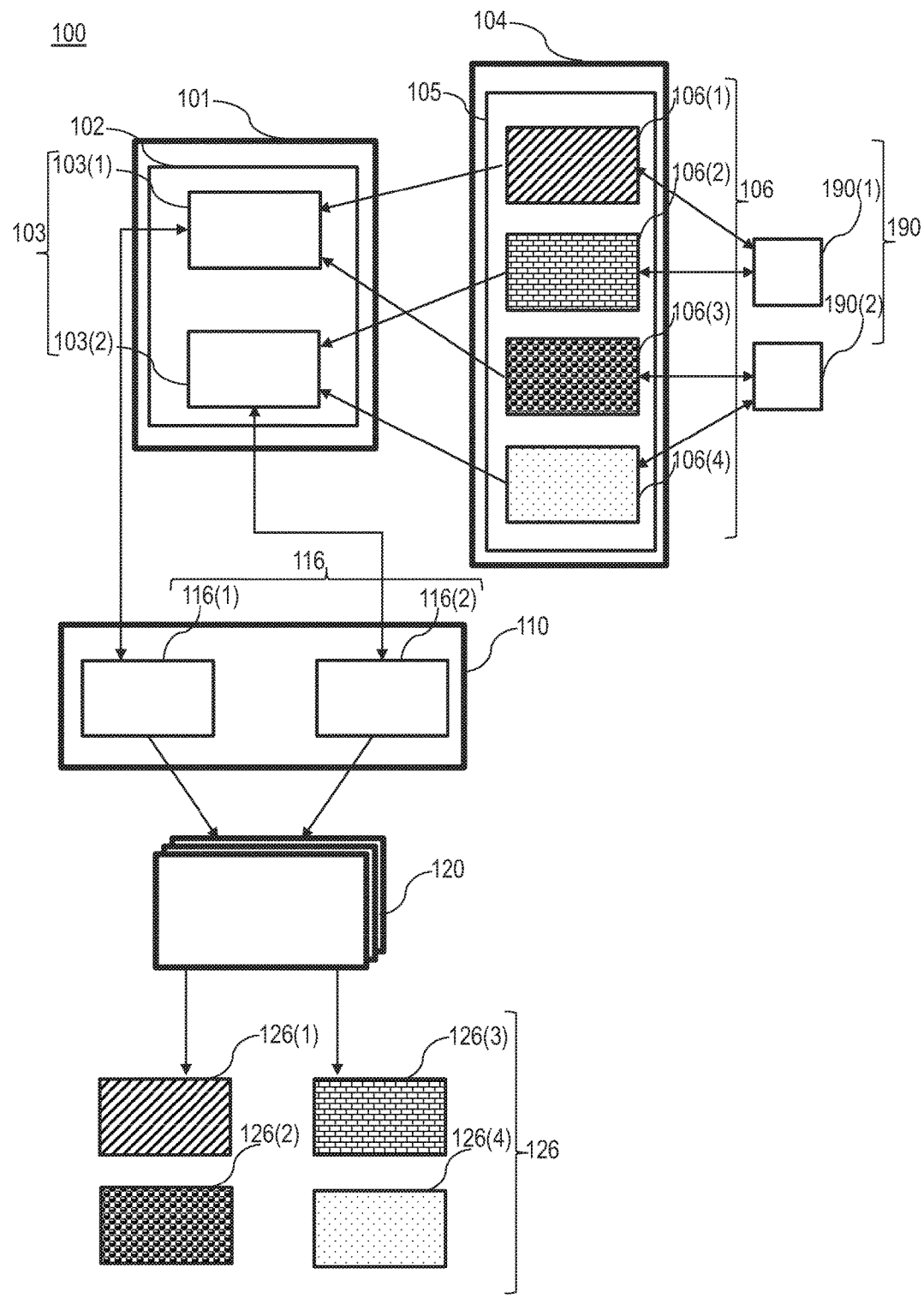
FIG. 1B is a schematic block diagram of a system for generating personalized videos and showing a more detailed aspect of pre-rendering and rendering of reusable video portions, according to some embodiments of the invention.

It is noted that the number of rendered reusable video portions 126 can be larger than the number of non-rendered reusable video portions 116 (such that R1>R), as, for example, rendered reusable video portions 126 can include all (or at least some) possible variations of each (or at least some) of reusable video portions 116 being populated/associated with all (or at least some) possible dataset values 106 for the dynamic data element(s) 103 in the respective reusable video portions 116 for all (or at least some) of plurality of recipients 190 (e.g., as described below with respect to FIG. 1B).

Repository module 130 can be in communication with rendering module(s) 120 and managing module 140. Repository module 130 can receive and store rendered video portions (e.g., rendered static video portions 114 and/or rendered reusable video portions 116).

In some embodiments, each of the rendered video portions being stored in repository module 130 is accompanied with a unique identifier (e.g., metadata) that provides an information concerning the dynamic element and the data set value associated with the respective rendered video portion.

Managing module 140 can be in communication with at least one of: video template storage 102, data set storage 105, video portions storage 110, rendering module(s) 120 repository module 130 and/or video generation module 150. Managing module 140 can control and/or coordinate the operation of modules that are in communication therewith.

Managing module can receive a request 141 for a personalized video from one or more specific recipients. For example, FIG. 1A shows receipt of request 141 from specific recipient 190(2). In some embodiments, managing module 140 can further retrieve, from data set 105, recipient-specific data set values 106a of data set values 106 that are associated with the specific recipient. In some embodiments, request 141 for the personalized video being received from the specific recipient can include recipient-specific data set values 106a thereof.

Managing module 140 can determine recipient-specific rendered reusable video portions 126a of rendered reusable video portions 126 that are associated with the specific recipient from which request 141 is received. The determination of recipient-specific rendered reusable video portions 126a can be based on recipient-specific data set values 106a. For example, recipient-specific rendered reusable video portions 126a are indicated in FIG. 1A as $rsrrp_h$, where h=1, ..., R2 and R2 is an integer value and R2≤R.

Video generation module 150 can be in communication with repository module 130 and with managing module 140. Video generation module 150 can combine (e.g., upon receipt of request 141 from the specified recipient by managing module 140) recipient-specific rendered reusable video portions 126a with rendered static video portions 124 to provide personalized video 152.

According to some embodiments, managing module 140 determines recipient-specific unique video portions 118a of unique video portions 118 that are required to provide personalized video 152. For example, recipient-specific unique video portions 118a are indicated as $rsup_f$ in FIG. 1A, where f=1, ..., U1, U1 is an integer value and U1≤U.

Rendering module(s) 120 can render recipient-specific unique video portions 118a to yield recipient-specific rendered unique video portions 128a. For example, recipient-specific rendered unique video portions 128a are indicated in FIG. 1A as $rsrup_g$, where g=1, ..., U1. Recipient specific rendered unique video portions 128a can be stored in repository module 130.

In some embodiments, managing module 140 distributes the rendering of at least one of: static video portions 114, reusable video portions 116 and/or recipient specific unique video portions 118a, among different rendering module(s) 120 to provide parallel rendering of the video portions thereof.

Video generation module 150 can further combine recipient-specific rendered unique video portions 128a with recipient-specific rendered reusable video portions 126a and static rendered video portions 124 to provide personalized video 152.

According to some embodiments, at least one of recipient-specific unique video portions 118a that is required to provide personalized video 152 can be already rendered (e.g., during previous sessions and/or for previous recipients) and can be stored among rendered video portions in repository module 130.

Managing module 140 can determine at least one required recipient-specific unique video portion of recipient-specific unique video portions 118a that is required to provide personalized video 152, based on recipient-specific data set values 106a (e.g., upon receipt of request 141 from the specific recipient). Managing unit 140 can further identify the at least one required recipient-specific unique video portion in repository module 130 of rendered video portions.

In some embodiments, upon identification of the at least one required recipient-specific unique video portion in repository module 130, managing module 140 retrieves corresponding at least one rendered required recipient-specific unique video portion.

In some embodiments, upon failure to identify the at least one required unique video portion in repository module 130, rendering module(s) 120 renders the at least one required recipient-specific unique video portion to provide the at least one rendered required recipient-specific unique video portion (as described above).

Video generation module 150 can further combine the at least one rendered required recipient-specific unique video portion with rendered static video portions 124, recipient-specific rendered reusable video portions 126 and optionally with other recipient-specific rendered unique video portions 128a, to provide personalized video 152.

For example, a first unique video portion provides a first name of the specific recipient and a second unique video portion provides a surname of the specific recipient. Further in this example, the first unique video portions and the second unique video portions for a first previous recipient John Smith (where John is first name and Smith is surname) and for a second previous recipient Jane Scott (where Jane is first name and Scott is surname) have been already rendered and stored in repository module 130. Yet in this example, the first unique video portion and the second unique video portion of the specific recipient John Scott (where John is first name and Scott is surname) can already exist and can be stored in repository module 130. Accordingly, the first unique video portion and the second unique video portion for the specific recipient John Scott needs not be rendered and can be retrieved from repository module and further combined by video generation module 150 (e.g., with other rendered video portions 122, as described above) to provide personalized video 152.

According to some embodiments, managing module 140/video generation module 150 initiates a streaming of personalized video 152 before all video portions of video portions 112 that are required to generate the personalized video thereof are rendered. For example, managing module 140/video generation module 150 can initiate the streaming of personalized video 152 that contains at least one video portion of video portions 112 that is not rendered (e.g., as described below with respect to FIG. 1C).

As would be apparent to those of ordinary skill in the art, each module or storage in system 100 can be implemented on its own computing device, a single computing device, or a combination of computing devices. The communication between the elements of system 100 can be wired and/or wireless.

Reference is now made to FIG. 1B, which is a schematic block diagram of a system 100 for generating personalized videos and showing a more detailed aspect of pre-rendering and rendering of reusable video portions 116, according to some embodiments of the invention.

In an example shown in FIG. 1B, system 100 can generate personalized videos for two recipients 190—a first recipient 190(1) and a second recipient 190(2), video template 102 can include two dynamic data elements 103—a first dynamic element 103(1) and a second dynamic element 103(2), and data set 105 can include a first data set value 106(1) that is a possible value for first dynamic data element 103(1) (optionally defined/predetermined for first recipient 190(1)), a second data set value 106(2) that is a possible value for second dynamic data element 103(2) (optionally defined/predetermined for first recipient 190(1)), a third data set value 106(3) that is a possible value for first dynamic data element 103(1) (optionally defined/predetermined second recipient 190(2)) and a fourth data set value 106(4) that is a possible value for second dynamic data element 103(2) (optionally defined/predetermined for second recipient 190(2)).

Yet in example of FIG. 1B, managing module 140 (not shown in FIG. 1B for sake of clarity, but described above with respect to FIG. 1A) can determine two reusable video portions 116—a first reusable video portion 116(1) that includes/associated with first dynamic data element 103(1) and a second reusable video portion 116(2) that includes/associated with second dynamic data element 103(2) (e.g., as described above with respect to FIG. 1A). First reusable video portion 116(1) and second reusable video portion 116(2) can be stored in video portions storage 110.

Yet in example of FIG. 1B, managing module 140 can determine and rendering module(s) 120 can render all possible variations of first reusable video portion 116(1) based on first data set value 106(1) and third data set value 106(3) to yield a first rendered reusable video portion 126(1) and a second rendered reusable video portion 126(2). Managing module 140 can determine and rendering module(s) 120 can further render all possible variations of second reusable video portion 116(2) based on second data set value 106(2) and fourth data set value 106(4) to yield a third rendered reusable video portion 126(3) and a fourth rendered reusable video portion 126(4). Thus, rendered video portions 126 (e.g., first rendered reusable video portion 126(1), second rendered reusable video portion 126(2), third rendered reusable video portion 126(3) and fourth rendered reusable video portion 126(4)) can include all possible variations thereof.

Figure 1C:
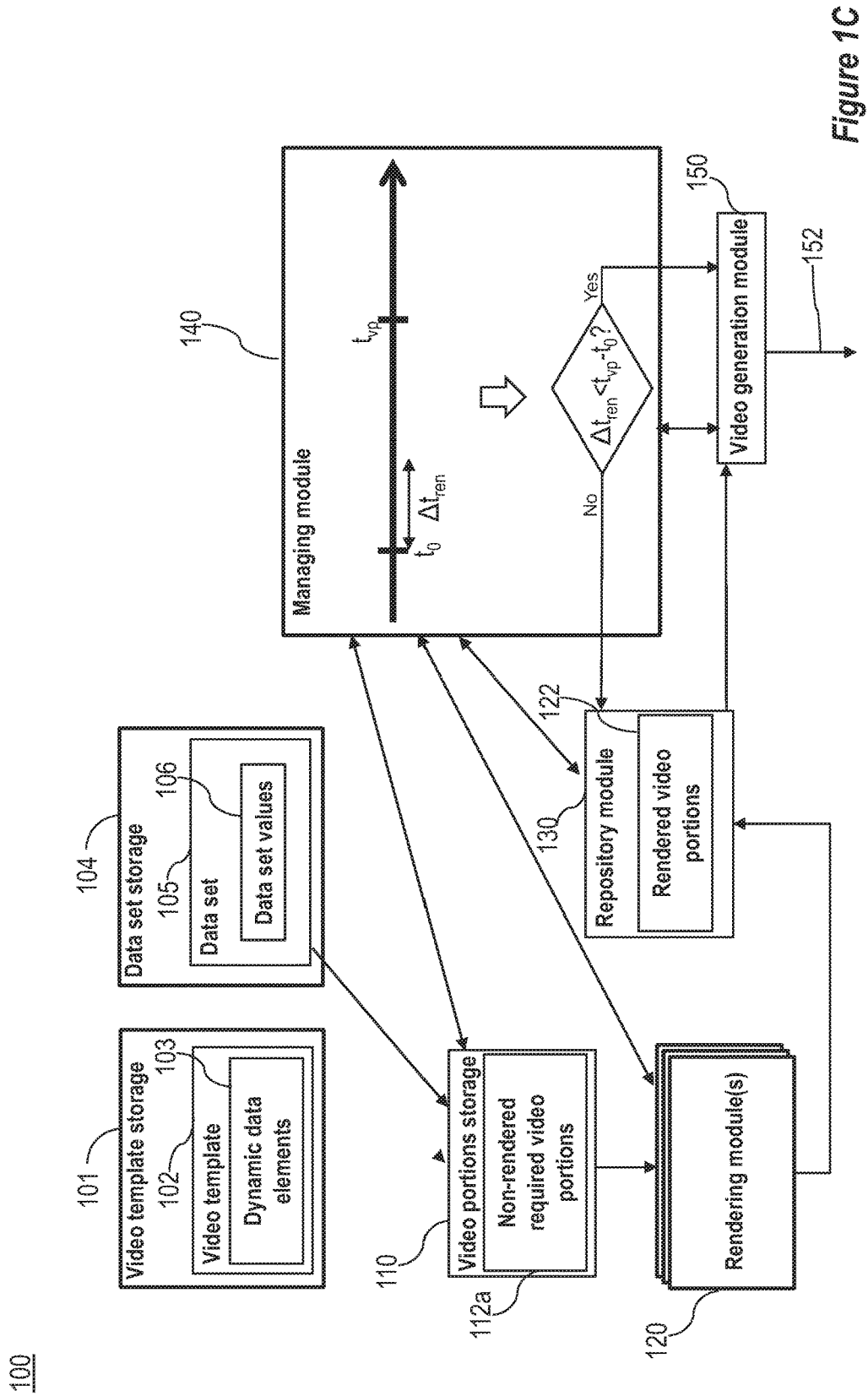
FIG. 1C is a schematic block diagram of a system for generating personalized videos and showing a more detailed aspect of streaming a personalized video that includes at least one video portion that is non-rendered, according to some embodiments of the invention.

Reference is now made to FIG. 1C, which is a schematic block diagram of a system 100 for generating personalized videos and showing a more detailed aspect of streaming a personalized video that includes at least one video portion 112*a* that is non-rendered, according to some embodiments of the invention.

According to some embodiments, system 100 initiates a streaming of personalized video 152 (e.g., by video generation module 150) before all video portions of video portions 112 that are required to generate the personalized video thereof are rendered.

Managing module 140 can determine at least one video portion 112*a* of video portions 112 that is required to generate personalized video 152 for the specific recipient and that is not rendered. The determination of at least one video portion 112*a* can be based on data set values 106 (or recipient-specific data set values 106*a*) of data set 105, as described above with respect to FIG. 1A.

In various embodiments, at least one video portion 112*a* is one of: reusable video portions 116 and/or unique video portions 118 and/or recipient-specific unique video portions 118*a*.

Managing module 140 can further determine corresponding at least one streaming time point at which at least one video portion 112*a* (the required and non-rendered video portion) is intended to be streamed, based on video template 102. For example, streaming time point is indicated as $t_{vp}$ in FIG. 1C.

Managing module 140 can further determine corresponding at least one rendering time required to render at least one video portion 112*a*, based on video template 102 and data set values 106 (or recipient-specific data set values 106*a*). For example, rendering time is indicated as $\Delta t_{ren}$ in FIG. 1C.

In some embodiments, if the at least one rendering time $\Delta t_{ren}$ is smaller than at least one streaming time $t_{vp}-t_0$ (where $t_0$ is a time point at which streaming is initiated/to be initiated), video generation module 150 initiates streaming of personalized video 152. In parallel, rendering module(s) 120 can render at least one video portion 112*a* that can be combined by video generation module 150 into personalized video 152 once rendered.

In some embodiments, if the at least one rendering time $\Delta t_{ren}$ is larger than the at least one streaming time $t_{vp}-t_0$, video generation module 150 will wait until the at least one video portion 112*a* is rendered.

Figure 1D:
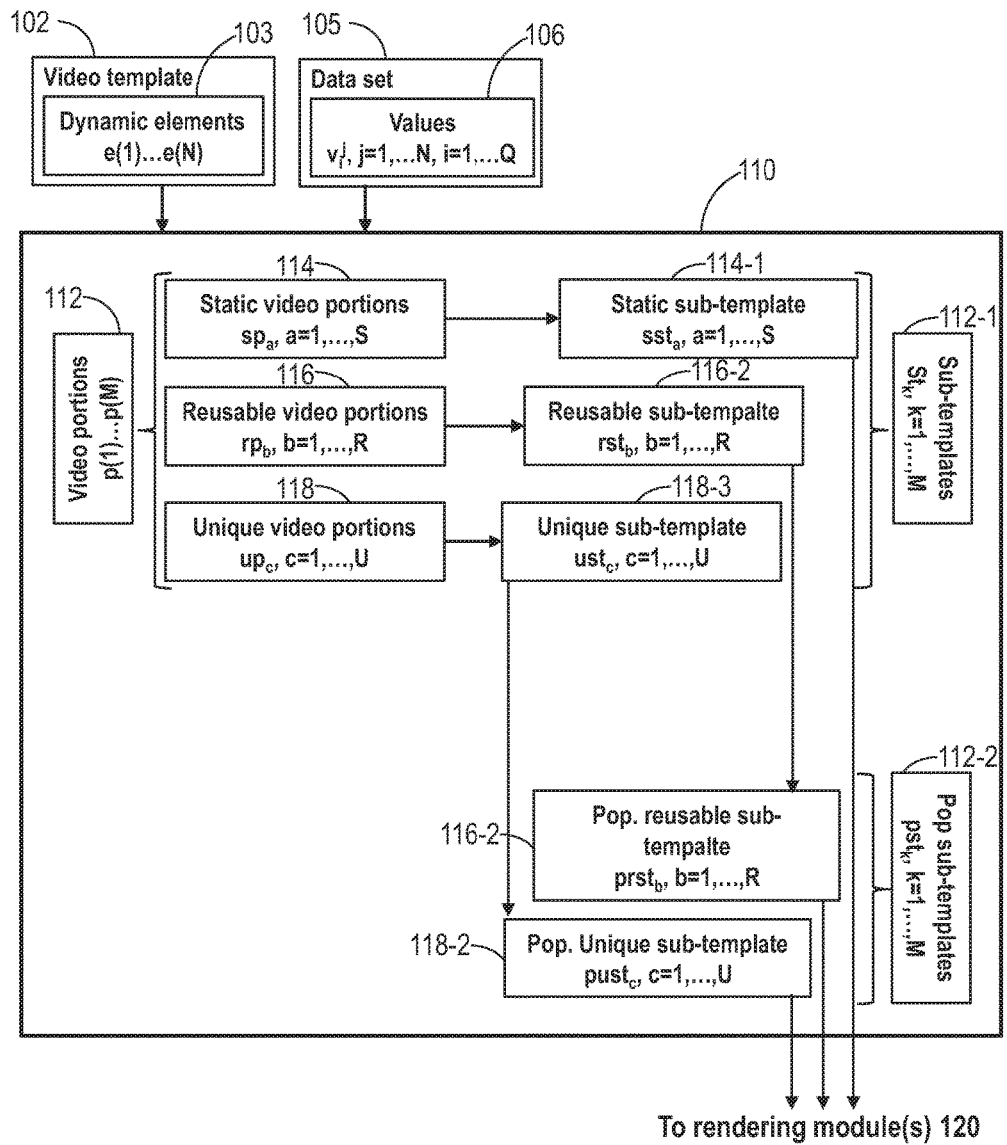
FIG. 1D is a more detailed aspect of a video portions storage of a system for generating personalized videos, according to some embodiments of the invention.

Reference is now made to FIG. 1D, which is a more detailed aspect of a video portions storage 110 of a system 100 for generating personalized videos, according to some embodiments of the invention.

According to some embodiments, managing module 140 (not shown in FIG. 1D for sake of clarity, but described above with respect to FIG. 1A) determines sub-templates 112-1 for each (or at least some) of plurality of recipients 190, based on video portions 112 and data set values 106 of data set 105 (recipients 190 are not shown in FIG. 1D, but described above with respect to FIG. 1A). Sub-templates 112-1 can be stored in video portions storage 110.

For example, sub-templates 112-1 can include static sub-templates 114-1 (corresponding to static video portions 114) indicated as $sst_a$ (where a=1, . . . , S) in FIG. 1D, reusable sub-templates 116-1 (corresponding to reusable video portions 116) indicated as $rst_b$ (where b=1, . . . , R) in FIG. 1D and unique sub-templates 118-1 (corresponding to unique video portions 118) indicated as $ust_c$ (where a=1, . . . , U) in FIG. 1D.

Managing module 140 can further populate at least some of sub-templates 112-1 based on data set values 106 of data set 105 to yield populated sub-templates 112-2. The population thereof can include associating dynamic data elements 103 in sub-templates 112-1 with respective data set values 106 (e.g., as described above with respect to FIG. 1A).

For example, populated sub-templates 112-2 can include populated reusable sub-templates 116-1 (corresponding to reusable sub-templates 116-1) indicated as $prst_b$ in FIG. 1D and unique sub-templates 118-2 (corresponding to unique sub-templates 118-1) indicated as $pust_c$ in FIG. 1D.

Populated sub-templates 118-2 can be transferred to rendering module(s) 120 for rendering to yield rendered video portions 122 (e.g., as described above with respect to FIG. 1A).

Figure 2:
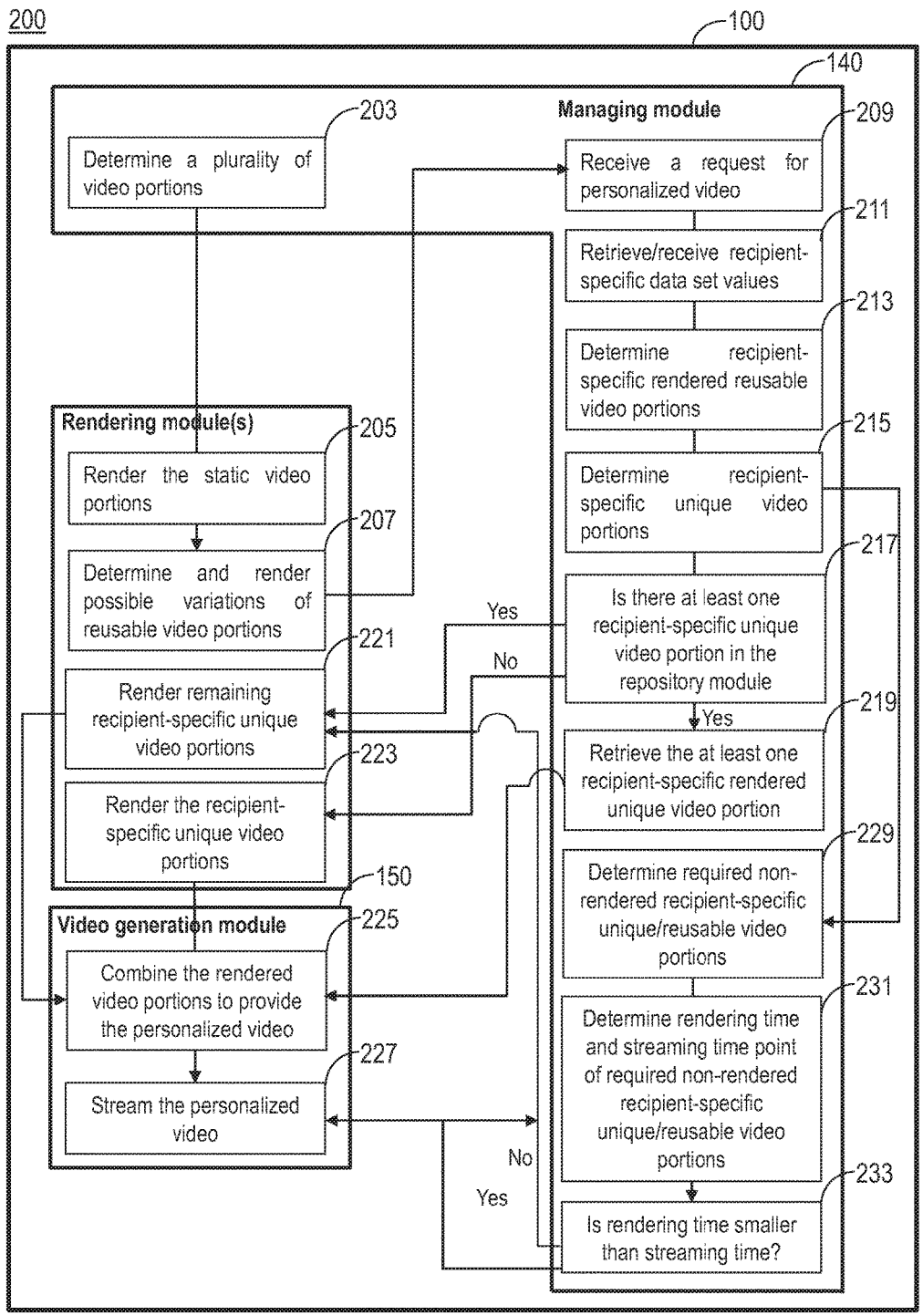
FIG. 2 is a flowchart of a method performed by a system for generating personalized videos, according to some embodiments of the invention.

Reference is now made to FIG. 2, which is a flowchart of a method 200 (e.g., as performed by system 100, as described above with respect to FIGS. 1A-1D) for generating personalized videos, according to some embodiments of the invention.

It is noted that method 200 is not limited to the flowcharts illustrated in FIG. 2 and to the corresponding description. For example, in various embodiments, method 200 needs not move through each illustrated box or stage, or in exactly the same order, as illustrated and described. It is also noted that, in various embodiments, at least some boxes or stages of method 200 needs not be performed by exactly the same elements of system 100 as illustrated and described.

According to some embodiments, managing module 140 determines 203 a plurality of video portions, based on a video template that includes a plurality of dynamic data elements and a data set that includes data set value, wherein each of the plurality of video portions can be static, reusable or unique.

For example, the video template, the dynamic data elements, the data set, the data set values, the static video portions, the reusable video portions and/or the unique video portions can be video template 102, dynamic data elements 103, data set 105, data set values 106 static video portions 114, reusable video portions 116 and the unique video portions 118, respectively, as described above with respect to FIG. 1A.

According to some embodiments, rendering module(s) 120 renders 205 the static video portions to yield rendered static video portions (e.g., rendered static video portions 124, as described above with respect to FIG. 1A). Rendering module(s) 120 can determine and render 207 all (or at least some) possible variations of each (or at least some) of the reusable video portions, based on the data set values of the data set, to yield rendered reusable video portions (e.g., rendered reusable video portions 126, as described above with respect to FIGS. 1A and 1B).

According to some embodiments, managing module 140 receives 209 a request for a personalized video from a specific user (e.g., request 141, as described above with respect to FIG. 1A). In various embodiments, managing module 140 retrieves or receives 211 recipient-specific data set values of the data set values that are associated with the specific recipient (e.g., recipient-specific data set values 106*a*, as described above with respect to FIG. 1A).

Managing module 140 can determine 213 recipient-specific rendered reusable video portions of the rendered reusable video portions that are associated with the specific recipient from which the request is received and that are required to provide the personalized video, based on the recipient-specific data set values (e.g., recipient-specific rendered reusable video portions 126*a*, as described above with respect to FIG. 1A).

Managing module 140 can determine 215 recipient-specific unique video portions of the unique video portions that are required to provide the personalized video, based on the recipient-specific data set values (e.g., recipient-specific unique video portions 118*a*, as described above with respect to FIG. 1A).

Managing module 140 can determine and identify 217 at least one of the recipient-specific unique video portions in the repository module of rendered video portions (e.g., as described above with respect to FIG. 1A).

In some embodiments, (e.g., upon identification thereof) managing module 140 retrieves 219 corresponding at least one recipient-specific rendered unique video portion from the repository module and rendering module(s) 120 renders 221 remaining unique video portions of the recipient-specific video portions to provide recipient-specific rendered unique video portions (e.g., recipient-specific rendered unique video portions 128*a*, as described above with respect to FIG. 1A).

In some embodiments, (e.g., upon failure to identify the at least one required video portion in the repository module) rendering module(s) 120 renders 223 the recipient-specific unique video portions to provide the recipient-specific rendered unique video portions (e.g., recipient-specific rendered unique video portions 128*a*, as described above with respect to FIG. 1A).

Video generation module 150 can combine 225 the rendered static video portions, the recipient-specific rendered reusable video portions and/or the recipient-specific rendered unique video portions to provide the personalized video (e.g., personalized video 152, as described above with respect to FIG. 1A).

Video generation module 150 can further stream 227 the personalized video.

According to some embodiments, managing module 140 determines 229 at least one required non-recipient-specific rendered unique or reusable video portion of the recipient-specific unique or reusable video portions that is required to provide the personalized video and that is not rendered (e.g., at least one required non-rendered video portion 112*a*, as described above with respect to FIG. 1C).

Managing module 140 can determine 231 at least one streaming time point at which at least one required non-recipient-specific rendered unique or reusable video portion is intended to be streamed (e.g., at least one streaming time point $t_{vp}$, as described above with respect to FIG. 1C) and at least one rendering time required to render the at least one required non-recipient-specific rendered unique video portion (e.g., at least one rendering time $\Delta t_{ren}$, as described above with respect to FIG. 1C).

Managing module 140 can further determine 233 whether the at least one rendering time is smaller than at least one streaming time (e.g., streaming time $t_{vp}-t_0$, as described above with respect to FIGS. 1A and 1C).

In some embodiments, (if the at least one rendering time is smaller than the at least one streaming time) video generation module 150 streams 227 the personalized video, while rendering module(s) 120 renders 221 at least one required non-recipient-specific rendered unique or reusable video portion thereof (that will be further combined, upon rendering, into the personalized video) (e.g., as described above with respect to FIGS. 1A and 1C).

In some embodiments, (if the at least one rendering time is larger than the at least one rendering time), video generation module 150 waits until the at least one required non-recipient-specific rendered unique or reusable video portion is being rendered 221, before streaming 231 the personalized video (e.g., as described above with respect to FIGS. 1A and 1C).

According to some embodiments, method 200 further includes adding all the rendered video portions to a repository module of rendered video portions (e.g., repository module 130, as described above with respect to FIG. 1A).

As would be apparent to those of ordinary skill in the art, each module or storage in system 100 can be implemented on its own computing device, a single computing device, or a combination of computing devices. The communication between the elements of system 100 can be wired and/or wireless.

Figure 3:
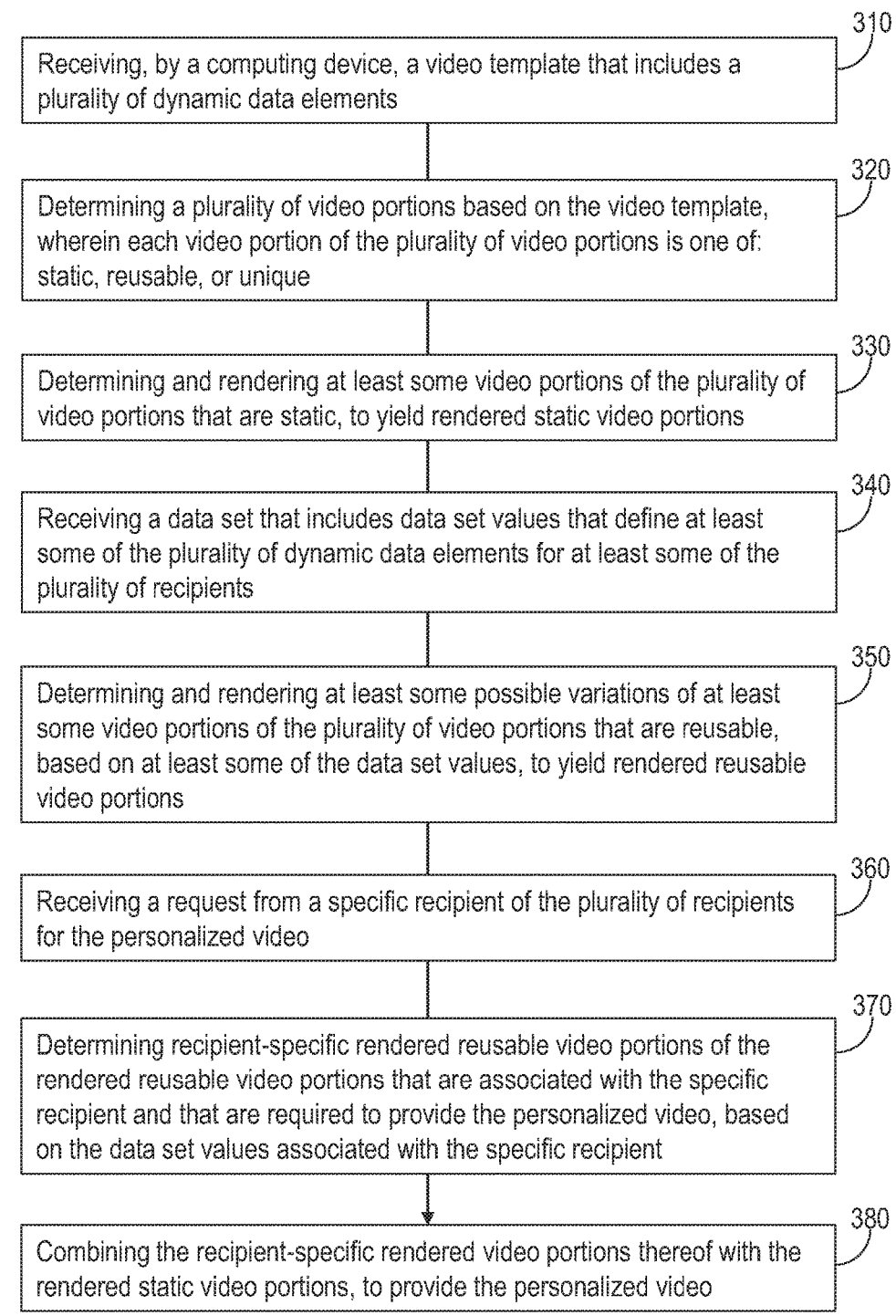
FIG. 3 is a flowchart of a method of generating personalized videos, according to some embodiments of the invention.

Reference is now made to FIG. 3, which is a flowchart of a method 300 of generating personalized videos, according to some embodiments of the invention.

Method 300 can be implemented by system 100, which can be configured to implement method 300. It is noted that method 300 is not limited to the flowcharts illustrated in FIG. 3 and to the corresponding description. For example, in various embodiments, method 300 needs not move through each illustrated box or stage, or in exactly the same order as illustrated and described.

According to some embodiments, method 300 includes receiving 310, by a computing device, a video template that includes a plurality of dynamic data elements. For example, video template 102 and dynamic data elements 103 as described above with respect to FIG. 1A.

According to some embodiments, method 300 includes determining 320 a plurality of video portions based on the video template, wherein each video portion of the plurality of video portions is one of: static, reusable, or unique. For example, static video portions 114, reusable video portions 116 and unique video portions 118 as described above with respect to FIG. 1A.

In some embodiments, the static video portions of the plurality of video portions do not change between different recipients of the plurality of recipients (e.g., recipients 190, as described above with respect to FIG. 1A). In some embodiments, the reusable video portions of the plurality of video portions can change, within a bounded set of values, between different recipients of the plurality of recipients. In some embodiments, the unique video portions of the plurality of video portions can change, within an unbounded set of values, between different recipients of the plurality of recipients.

In some embodiments, method 300 includes determining at least some of the plurality of video portions such that a time duration required to render each of the video portions thereof is no more than a predetermined rendering time constant (e.g., as described above with respect to FIG. 1A).

In some embodiments, method 300 includes determining at least some of the plurality of video portions such that the video portions thereof are independent from each other (e.g., as described above with respect to FIG. 1A).

In some embodiments, method 300 further includes determining each of at least some of the plurality of video portions to include a single dynamic data element of the plurality of dynamic data elements (e.g., as described above with respect to FIGS. 1A and 1B).

According to some embodiments, method 300 includes determining and rendering 330 at least some video portions of the plurality of video portions that are static, to yield rendered static video portions (e.g., rendered static video portions 124, as described above with respect to FIG. 1A).

In some embodiments, method 300 includes determining and rendering all video portions of the plurality of video portions that are static, to yield rendered static video portions (e.g., rendered static video portions 126, as described above with respect to FIG. 1A).

According to some embodiments, method 300 includes receiving 340 a data set that includes data set values (e.g., data set 105 and data set values 106, as described above with respect to FIG. 1A). Data set values 106 can be a set of possible values for at least some of the plurality of dynamic data elements (e.g., as described above with respect to FIG. 1A).

According to some embodiments, method 300 includes determining and rendering 350 at least some possible variations of at least some video portions of the plurality of video portions that are reusable, based on at least some of the data set values, to yield rendered reusable video portions (e.g., rendered reusable video portions 126, as described above with respect to FIGS. 1A and 1B).

In some embodiments, method 300 includes determining and rendering all possible variations of all video portions of the plurality of video portions that are reusable, based on the data set values, to yield rendered reusable video portions (e.g., as described above with respect to FIGS. 1A and 1B).

According to some embodiments, method 300 includes receiving 360 a request from a specific recipient of the plurality of recipients for the personalized video (e.g., request 141, as described above with respect to FIG. 1A).

According to some embodiments, method 300 includes determining 370 recipient-specific rendered reusable video portions of the rendered reusable video portions that are associated with the specific recipient and that are required to provide the personalized video, based on the data set values associated with the specific recipient (e.g., recipient-specific rendered reusable video portions 126a, as described above with respect to FIG. 1A).

According to some embodiments, method 300 includes combining 380 the recipient-specific rendered video portions thereof with the rendered static video portions, to provide the personalized video (e.g., personalized video 152, as described above with respect to FIG. 1A).

According to some embodiments, method 300 includes retrieving, from the data set, recipient-specific data set values associated with the specific recipient or receiving recipient-specific data set values thereof (e.g., recipient-specific data set values 106a, as described above with respect to FIG. 1A).

In some embodiments, method 300 further includes determining recipient-specific unique video portions of the plurality of video portions that are required to provide the personalized video (e.g., recipient-specific unique video portions 118a, as described above with respect to FIG. 1A).

In some embodiments, method 300 further includes rendering the recipient-specific unique video portions to yield recipient-specific rendered unique video portions (e.g., recipient-specific rendered unique video portions 128a, as described above with respect to FIG. 1A).

In some embodiments, method 300 further includes combining the recipient-specific rendered unique video portions with the recipient-specific rendered reusable video portions and the rendered static video portions to provide the personalized video (e.g., as described above with respect to FIG. 1A).

According to some embodiments, method 300 includes rendering the recipient-specific unique video portions in parallel (e.g., as described above with respect to FIG. 1A).

According to some embodiments, method 300 includes storing the rendered static video portions, the rendered reusable video portions and the recipient-specific rendered unique video portion in a repository of rendered video portions (e.g., repository module 130, as described above with respect to FIG. 1A).

According to some embodiments, method 300 includes determining at least one required recipient-specific unique video portion of the recipient-specific unique video portions that is required to provide the personalized video, based on the recipient-specific data set values (e.g., as described above with respect to FIG. 1A).

In some embodiments, method 300 further includes identifying the at least one required recipient-specific unique video portion in the repository of rendered video portions (e.g., as described above with respect to FIG. 1A).

In some embodiments, method 300 further includes upon failure to identify the at least one required recipient-specific unique video portion in the repository, rendering the at least one required recipient-specific unique video portion to provide the at least one rendered required recipient-specific rendered unique video portion (e.g., as described above with respect to FIG. 1A).

In some embodiments, method 300 further includes combining the at least one rendered required recipient-specific unique video portion with the recipient-specific rendered reusable video portions and the rendered static video portions, to provide the personalized video (e.g., as described above with respect to FIG. 1A).

In some embodiments, method 300 further includes upon identification of the at least one required recipient-specific unique video portion in the repository, retrieving corresponding at least one rendered required recipient-specific unique video portion (e.g., as described above with respect to FIG. 1A).

In some embodiments, method 300 further includes combining the at least one rendered required recipient-specific unique video portion with the recipient-specific rendered reusable video portions and the rendered static video portions, to provide the personalized video (e.g., as described above with respect to FIG. 1A).

According to some embodiments, method 300 includes determining at least one required non-rendered video portion of the plurality of video portions that is required to provide the personalized video and that is not rendered. (e.g., at least one required non-rendered video portion 112a, as described above with respect to FIG. 1C)

In some embodiments, method 300 further includes determining, based on the video template, at least one time point at which the at least one required non-rendered video portion is intended to be streamed (e.g., at least one time point $t_{vp}$, as described above with respect to FIGS. 1A and 1C).

In some embodiments, method 300 further includes determining at least one rendering time required to render the at least one required non-rendered video portion thereof (e.g., at least one rendering time $\Delta t_{ren}$, as described above with respect to FIGS. 1A and 1C).

In some embodiments, method 300 further includes streaming the personalized video if the at least one rendering time is smaller than at least one streaming time (e.g., streaming time $t_{vp}-t_0$, as described above with respect to FIG. 1A).

Some advantage of the present invention can include providing parallel and/or on-demand and/or video portions-based rendering systems and methods that can enable generating a plurality of personalized videos for a plurality of recipients.

Other advantages of the invention can include significantly reducing the amount of processing resources and/or an amount of time required to render the personalized videos thereof, for example, as compared to current available systems and methods.

Another advantage of the invention can include the ability to determine video portions that are independent from each other, thereby allowing pre-rendering of all possible variations of at least some of the video portions (e.g., reusable video portions), while ensuring that the rendering computational order is the same as of the number of all possible variations thereof.

Another advantage of the invention can include utilization of the sub-templates for rendering of the video portions, thereby increasing the efficiency of the rendering.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for generating personalized videos for a plurality of recipients, the system comprising at least one computing device to:
   receive a video template that includes a plurality of dynamic data elements and a data set that includes possible data set values for at least some of the plurality of dynamic data elements;
   determine a plurality of video portions based on the video template, wherein each video portion of the plurality of video portions is one of: static, reusable, or unique, wherein a static video portion does not change between different recipients of the plurality of recipients, a reusable video portion can change, within a bounded set of values, between different recipients of the plurality of recipients, and a unique video portion can change, within an unbounded set of values, between different recipients of the plurality of recipients;

render at least some video portions of the plurality of video portions that are static, to yield rendered static video portions;

render at least some possible variations of at least some video portions of the plurality of video portions that are reusable, based on at least some of the data set values, to yield rendered reusable video portions;

receive a request from a specific recipient of the plurality of recipients for a personalized video;

determine recipient-specific rendered reusable video portions of the rendered reusable video portions that are associated with the specific recipient and that are required to provide the personalized video, based on recipient-specific data set values of the data set values that are associated with the specific recipient; and combine the recipient-specific rendered reusable video portions thereof with the rendered static video portions, to provide the personalized video.

2. The system of claim 1, wherein the at least one computing device is further to determine at least some of the plurality of video portions such that a time duration required to render each of the video portions thereof is no more than a predetermined rendering time constant.

3. The system of claim 1, wherein the at least one computing device is further to determine each of at least some of the plurality of video portions to include a single dynamic data element of the plurality of dynamic data elements to ensure that a total number of possible variations of the video portions to be rendered is of the same computational order as a total number of the data set values in the data set.

4. The system of claim 1, wherein the at least one computing device to:
retrieve, from the data set, the recipient-specific data set values or to receive the recipient-specific data set values thereof, and to determine, based on the recipient-specific data set values, recipient-specific unique video portions of the plurality of video portions that are required to provide the personalized video;
render the recipient-specific unique video portions, based on the recipient-specific data set values, to yield recipient-specific rendered unique video portions; and
combine the recipient-specific rendered unique video portions with the recipient-specific rendered reusable video portions and the rendered static video portions to provide the personalized video.

5. The system of claim 4, wherein the at least one computing device to render the recipient-specific unique video portions in parallel.

6. The system of claim 4, wherein the at least one computing device to store the rendered static video portions, the rendered reusable video portions and the recipient-specific rendered unique video portions.

7. The system of claim 6, wherein the at least one computing device to:
determine at least one required recipient-specific unique video portion of the recipient-specific unique video portions that is required to provide the personalized video, based on the recipient-specific data set values; and
identify the at least one required recipient-specific unique video portion in the repository module.

8. The system of claim 7, wherein the at least one computing device to:
render the at least one required recipient-specific unique video portion to provide the at least one rendered required recipient-specific unique video portion, upon failure to identify the at least one required recipient-specific unique video portion in the repository module; and
combine the at least one rendered required recipient-specific unique video portion with the recipient-specific rendered reusable video portions and the rendered static video portions, to provide the personalized video.

9. The system of claim 8, wherein the at least one computing device to:
retrieve corresponding at least one rendered required recipient-specific unique video portion from the repository module, upon identification of the at least one required recipient-specific unique video portion; and
combine the at least one rendered required recipient-specific unique video portion with the recipient-specific rendered reusable video portions and the rendered static video portions, to provide the personalized video.

10. The system of claim 1, wherein the at least one computing device to:
determine at least one required non-rendered video portion of the plurality of video portions that is required to provide the personalized video and that is not rendered;
determine, based on the video template, at least one streaming time at which the at least one required non-rendered video portion is intended to be streamed;
determine at least one rendering time required to render the at least one required non-rendered video portion thereof; and
stream the personalized video if the at least one rendering time is smaller than at least one streaming time.

11. A method for generating a personalized video for a plurality of recipients, the method comprising:
receiving, by a computing device, a video template that includes a plurality of dynamic data elements;
receiving a data set that includes possible data set values for at least some of the plurality of dynamic data elements;
determining a plurality of video portions based on the video template, wherein each video portion of the plurality of video portions is one of: static, reusable, or unique, wherein a static video portion does not change between different recipients of the plurality of recipients, a reusable video portion can change, within a bounded set of values, between different recipients of the plurality of recipients, and a unique video portion can change, within an unbounded set of values, between different recipients of the plurality of recipient;
determining and rendering at least some video portions of the plurality of video portions that are static, to yield rendered static video portions;
determining and rendering at least some possible variations of at least some video portions of the plurality of video portions that are reusable, based on at least some of the data set values, to yield rendered reusable video portions;
receiving a request from a specific recipient of the plurality of recipients for the personalized video;
determining recipient-specific rendered reusable video portions of the rendered reusable video portions that are associated with the specific recipient and that are required to provide the personalized video, based on recipient-specific data set values of the data set values that are associated with the specific recipient; and combining the recipient-specific rendered video portions thereof with the rendered static video portions, to provide the personalized video.

12. The method of claim 11, further comprising determining at least some of the plurality of video portions such that a time duration required to render each of the video portions thereof is no more than a predetermined rendering time constant.

13. The method of claim 11, further comprising determining each of at least some of the plurality of video portions to include a single dynamic data element of the plurality of dynamic data elements to ensure that a total number of possible variations of the video portions to be rendered is of the same computational order as a total number of the data set values in the data set.

14. The method of claim 11, further comprising:
retrieving, from the data set, the recipient-specific data set values or receiving the recipient-specific data set values thereof;
determining, based on the recipient-specific data set values, recipient-specific unique video portions of the plurality of video portions that are required to provide the personalized video;
rendering the recipient-specific unique video portions, based on the recipient-specific data set values, to yield recipient-specific rendered unique video portions; and
combining the recipient-specific rendered unique video portions with the recipient-specific rendered reusable video portions and the rendered static video portions to provide the personalized video.

15. The method of claim 14, further comprising rendering the recipient-specific unique video portions in parallel.

16. The method of claim 14, further comprising storing the rendered static video portions, the rendered reusable video portions and the recipient-specific unique video portion in a repository of rendered video portions.

17. The method of claim 16, further comprising:
determining at least one required recipient-specific unique video portion of the recipient-specific unique video portions that is required to provide the personalized video, based on the recipient-specific data set values; and
identifying the at least one required recipient-specific unique video portion in the repository of rendered video portions.

18. The method of claim 17, further comprising:
upon failure to identify the at least one required recipient-specific unique video portion in the repository, rendering the at least one required recipient-specific unique video portion to provide the at least one rendered required recipient-specific unique video portion; and
combining the at least one rendered required recipient-specific unique video portion with the recipient-specific rendered reusable video portions and the rendered static video portions, to provide the personalized video.

19. The method of claim 17, further comprising:
upon identification of the at least one required recipient-specific unique video portion in the repository, retrieving corresponding at least one rendered required recipient-specific unique video portion from the repository; and
combining the at least one rendered required recipient-specific unique video portion with the recipient-specific rendered reusable video portions and the rendered static video portions, to provide the personalized video.

20. The method of claim 14, further comprising:
determining at least one required non-rendered video portion of the plurality of video portions that is required to provide the personalized video and that is not rendered;
determining, based on the video template, at least one streaming time at which the at least one required non-rendered video portion is intended to be streamed;
determining at least one rendering time required to render the at least one required non-rendered video portion thereof; and
streaming the personalized video if the at least one rendering time is smaller than the at least one streaming time.

* * * * *